(12) United States Patent
Zarowski et al.

(10) Patent No.: US 11,262,457 B2
(45) Date of Patent: Mar. 1, 2022

(54) INTEGRATED INTERFERENCE MITIGATION FOR IRIDIUM USER HANDSETS AND GPS RECEIVERS

(71) Applicant: Mayflower Communications Company, Inc., Bedford, MA (US)

(72) Inventors: Christopher Jonathan Zarowski, Burlington, MA (US); Huan-Wan Tseng, Westford, MA (US); William LeComte, Burlington, MA (US)

(73) Assignee: Mayflower Communications Company, INC., Bedford, MA (US)

( * ) Notice: Subject to any disclaimer, the term of this patent is extended or adjusted under 35 U.S.C. 154(b) by 425 days.

(21) Appl. No.: 16/260,468

(22) Filed: Jan. 29, 2019

(65) Prior Publication Data

US 2020/0241145 A1 Jul. 30, 2020

(51) Int. Cl.

| | | |
|---|---|---|
| *G01S 19/21* | (2010.01) | |
| *G01S 19/23* | (2010.01) | |
| *G01S 19/24* | (2010.01) | |
| *G01S 19/14* | (2010.01) | |
| *G01S 19/36* | (2010.01) | |

(52) U.S. Cl.
CPC .............. *G01S 19/21* (2013.01); *G01S 19/23* (2013.01); *G01S 19/246* (2013.01); *G01S 19/14* (2013.01); *G01S 19/215* (2013.01); *G01S 19/36* (2013.01)

(58) Field of Classification Search
CPC ........ G01S 19/21; G01S 19/215; G01S 19/23; G01S 19/246; G01S 19/14; G01S 19/36

USPC ............ 342/357.59, 357.62, 357.63, 357.52, 342/357.76
See application file for complete search history.

(56) References Cited

U.S. PATENT DOCUMENTS

| | | | |
|---|---|---|---|
| 7,042,392 B2* | 5/2006 | Whelan ................. | G01S 19/215 342/357.29 |
| 7,218,931 B2* | 5/2007 | Karabinis ............ | G01N 35/028 455/13.4 |
| 7,333,053 B2* | 2/2008 | Lawrence ............... | G01S 19/32 342/357.72 |
| 7,873,095 B1* | 1/2011 | Stockmaster ............ | H04K 3/28 375/132 |
| 7,890,098 B2* | 2/2011 | Karabinis .......... | H04B 7/18513 455/429 |
| 9,581,699 B2* | 2/2017 | Zarowski ................ | G01S 19/36 |
| 9,647,748 B1* | 5/2017 | Mitchell ............ | H04B 7/18508 |
| 2002/0169578 A1* | 11/2002 | Yang ....................... | G01S 19/21 702/152 |

(Continued)

*Primary Examiner* — Chuong P Nguyen
(74) *Attorney, Agent, or Firm* — Kaplesh Kumar (57) ABSTRACT

System and method for concurrently protecting Iridium and GPS L1/L2 band received satellite signals against interference signals (e.g., jamming signals) using space-time adaptive processing (STAP). While the GPS signal is protected against jamming using Nulling of the interfering signals, the Iridium signal is protected using Beamforming. A single broadband small controlled reception pattern antenna (sCRPA) array receives both the GPS (L1 and L2) and Iridium signals for the STAP-based antijam solutions outputting filtered Iridium and GPS signals. Use of a common (small) broadband antenna and common front end signal processing of the received signals enables an integrated system for use on size, weight, and power constrained platforms such as drones, unmanned aerial vehicles (UAVs), and helicopters.

46 Claims, 7 Drawing Sheets

(56) References Cited

U.S. PATENT DOCUMENTS

2013/0241768 A1* 9/2013 Petersen ............... G01S 19/43
                                                    342/357.27
2019/0302271 A1* 10/2019 Panther ............... H01Q 9/0435
2019/0326886 A1* 10/2019 Lennen ................ G01S 19/39

* cited by examiner

| Iridium Satellite | Omni Breakpoint | Adapt Breakpoint | Protection |
|---|---|---|---|
| 64 | 60 dB | 35 dB | 25 dB |
| 47 | 60 dB | 30 dB | 30 dB |

Beamforming protection for Iridium satellites 64 and 47

FIG. 5

| Iridium Satellite | Omni Breakpoint | Adapt Breakpoint | Protection |
|---|---|---|---|
| 46 | 50 dB | 20 dB | 30 dB |
| 20 | 50 dB | 10 dB | 40 dB |
| 49 | 45 dB | 5 dB | 40 dB |
| 11 | 50 dB | 10 dB | 40 dB |
| 03 | 50 dB | 20 dB | 30 dB |

Beamforming protection for Iridium satellites 46, 20, 49, 11 and 3.

FIG. 6

| Iridium Satellite | Omni Breakpoint | Adapt Breakpoint | Protection |
|---|---|---|---|
| 31 | 70 dB | 30 dB | 40 dB |
| 32 | 70 dB | 45 dB | 25 dB |
| 91 | 70 dB | 45 dB | 25 dB |
| 58 | 65 dB | 40 dB | 25 dB |
| 96 | 65 dB | 30 dB | 35 dB |

Beamforming protection for Iridium satellites 31, 32, 91, 58, and 96.

FIG. 7

INTEGRATED INTERFERENCE MITIGATION FOR IRIDIUM USER HANDSETS AND GPS RECEIVERS

The present invention was made with U.S. Government support under Contract No. N68936-13-C-0131 awarded by the Naval Air Warfare Center Weapons Division of the Naval Air Systems Command (NAVAIR). The U.S. Government has certain rights to this invention.

FIELD OF THE INVENTION

This invention deals generally with protecting both the Iridium satellite communications system downlink data received using an Iridium user handset (radio, or transceiver) and the Global Positioning System (GPS) navigation data measurements obtained using a GPS receiver in a RF (Radio frequency) jammed environment. More particularly, this invention provides an integrated solution to the problem of protecting GPS and Iridium user links in a continuously or intermittently jammed environment.

BACKGROUND OF THE INVENTION in this specification and its claims, the terms "jamming" and "interference" are used interchangeably, and are meant to be construed broadly to include without limitation interference signals emitted by both narrowband and broadband jammers. Similarly, the term "GPS" is to be construed broadly, and must be read to include not only the United States' Global Positioning System and its transmitted signals, but all Global Navigation Satellite Systems ("GNSS") using CDMA ("Code Division Multiple Access") technology and their (i.e., GNSS's) broadcast signals. For avoidance of doubt, however, the claims herein describe such systems and signals as "GPS and other GNSS" systems and signals.

In a similar vein, the term "Iridium" communication system is to be construed broadly, and must be read to include not only the iridium communication system, but also all satellite and terrestrial communication systems operating in the 950 MHz to 1.65 GHz L-band spectrum that can be received by a broadband antenna covering the 950 MHz to 1.65 GHz range.

In general, Space Time Adaptive Processing (STAP) for anti-jam (AJ) is well-known (See, e.g., textbook E. D. Kaplan, C. J. Hegarty, *Understanding GPS: Principles and Applications*, Artech House, $2^{nd}$ edition) and has been used to suppress jamming (i.e., interfering) signals that may corrupt data transmissions from GPS satellites. The most basic STAP filter design computes the STAP filter weights vector to minimize the output power of the filter while avoiding the null weight vector solution. We refer to this solution herein as Nulling. As the GPS signals are below the receiver system noise floor while jamming signals are commonly above the noise floor, the Nulling STAP filter tends to suppress the jammer signal(s) with little attenuation of the GPS signal, unless the GPS signals and jammer signals arrive at the antenna array from similar direction(s).

By contrast, in the case of data communications satellite systems such as Iridium, the signals at the receiver are typically positive signal-to-noise ratio (SNR) and thus are above the noise floor of the receiver. In this case Nulling will tend to suppress not only the interference but also the desired signal. It is, therefore, necessary to adopt a STAP filter design where the filter weights minimize the output power of the filter while being constrained to maintain the gain in the desired signal (i.e., Iridium space vehicle (SV) or Link-16 terrestrial platform) direction. We refer to this solution as Beamforming, realized using a Beamformer and represented by the Capon beamforming solution See, e.g., J. Capon, "High-Resolution Frequency-Wavenumber Spectrum Analysis," Proc. IEEE, 57(8), August 1969, pp. 1408-1418 (hereinafter "Capon"); See also, N. L. Owsley, *Systolic Array Adaptive Beamforming*, NUSC Tech. Rep. 7981, Naval Underwater Systems Center, Newport, R.I., and New London, Conn., 21 Sep. 1987 (hereinafter "Owsley")).

It is beneficial to combine the protection of communication link signals, i.e., an Iridium user handset (radio) (for satellite communication) or Link data communication transceiver (for terrestrial communication), with the protection of a GPS receiver signal (for satellite navigation) employing a common wideband receive antenna and signal processing circuits to reduce the size, weight, power and cost (SWaP-C) of the integrated interference protection system solution for both communication and navigation receive links. The Iridium user data channel offers a means to provide the GPS receiver with aiding data in support of assisted-GPS (A-GPS) navigation operations. Since Beamforming is applied to protect the iridium signal, the computation of the STAP weights requires knowledge of the line-of-sight (LOS) vector from the platform antenna array to the Iridium SV, along with the antenna array/RF electronics response in that direction. This in turn requires platform position information obtained by the GPS receiver (which itself is protected using Nulling). Platform orientation information, similarly, may be obtained via an inertial navigation system (INS) mounted on the platform. Alternate means of accessing platform position and/or orientation, such as with the aid of magnetic sensors or visual aids, are within the scope of the instant invention and the claims herein. The Iridium satellite position is known via the almanac information, or provided by other means known to ordinary persons skilled in the art.

Presently, there is no integrated anti-jamming solution which protects both Iridium data communications and GPS user navigation signals in an efficient compact system or otherwise, thereby permitting each system to benefit from the operations of the other under interference conditions. The data communications capability of Iridium allows provision of aiding data (e.g., GPS navigation message) to GPS, and GPS position data enables setting the beam direction in the beamforming to protect Iridium.

Space-constrained military platforms, such as submarines, unmanned aerial vehicles, and aircraft, have had an evolving unmet need for concurrently protecting both Iridium communication and GPS navigation systems against jamming at a lower SWaP-C. This is achieved herein by the synergistic integration of the radio communication-navigation links, instead of simply adding the SWaP-C of two individual subsystems. No such system is currently available in any size, let alone one that is compact enough for use with the small platforms, including drones, UAVs and helicopters, where space is at a premium.

For the above reasons, compact integrated antijam ("AJ") systems using innovative antenna array design and signal processing solutions are required to simultaneously protect the iridium and GPS user equipment against interference while allowing installation and use aboard the smaller space-constrained platforms. The preferred solution herein integrates with a small broadband antenna array capable of operating at both GPS L1 and L2 bands as well as the Iridium user band.

SUMMARY OF THE INVENTION

The present invention solves the problem of concurrently protecting the Iridium and GPS user bands against interference in a suitably efficient and compact package using a small broadband controlled reception pattern antenna (sCRPA) that provides coverage of the GPS L1 and L2 bands along with the iridium user band. The GPS L1 band is centered at 1575.42. MHz with at least a 24 MHz bandwidth to accommodate the M-Code waveform. Similarly, the GPS L2 band is centered at 1227.60 MHz with at least a 24 MHz bandwidth to accommodate the M-Code waveform. The Iridium user band is centered at 1621.25 MHz with a bandwidth of 10.5 MHz, and so (like GPS) is also an L-band waveform. The integrated system disclosed herein achieves its antijam performance and size, weight and power goals by using a common broadband antenna and common front end signal processing for both the GPS receiver and the Iridium radio handset.

Figure 1:
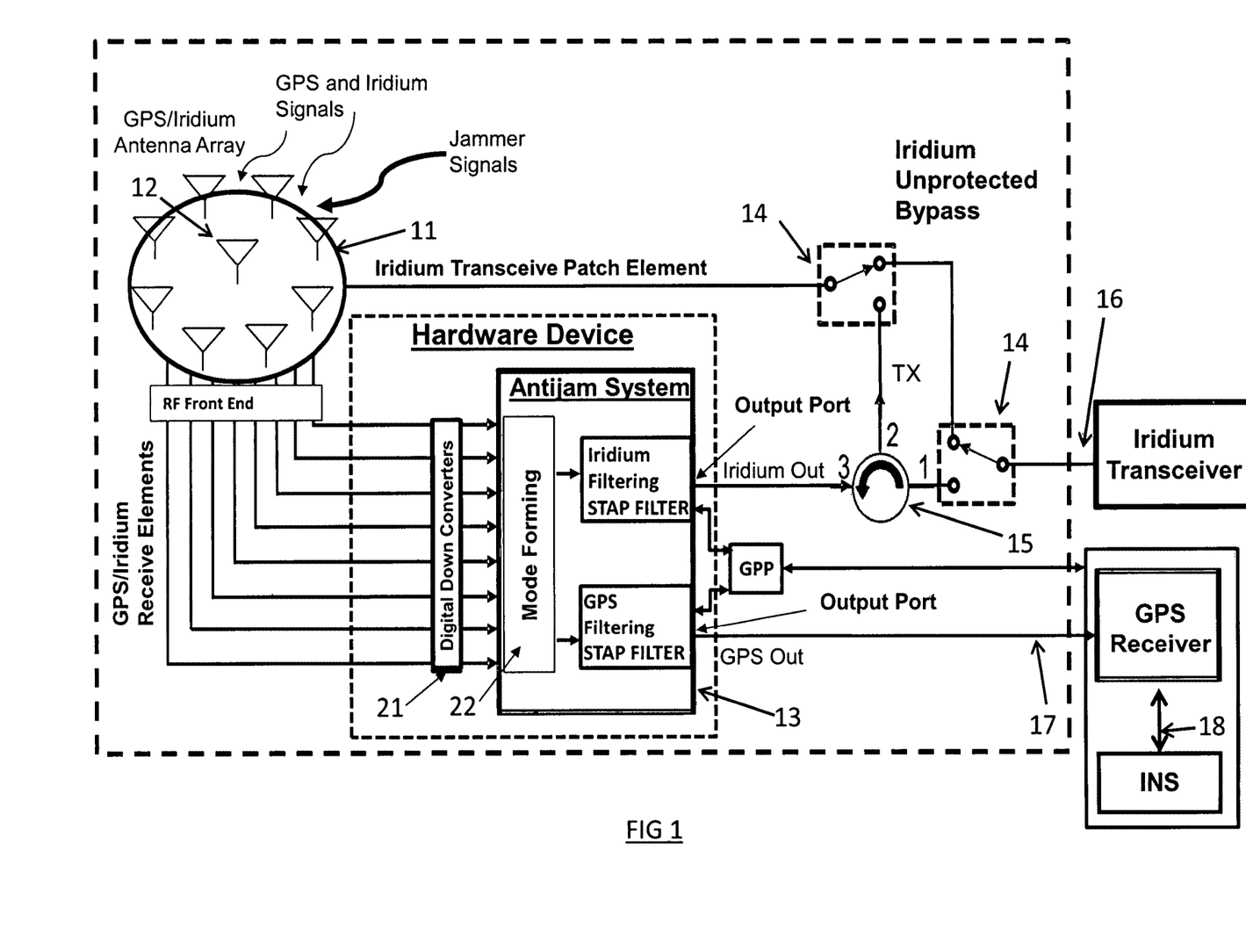
FIG. 1 is a block diagram of the main components of the integrated Iridium/GPS anti-jamming (AJ) system.

FIG. 1 is an overview of one embodiment of the system depicting an eight element sCRPA 11 broadband receive antenna array integrated with an iridium TX transceive (i.e., transmit and receive) patch antenna element 12 (The transceive patch element 12 supports Iridium user uplink data transmissions to the Iridium SV.) The specific types of patch element and array, and number of antenna elements are illustrative and not limiting. Signal outputs from the array are downconverted and digitized into complex baseband samples, available for digital mode forming (e.g., Butler array) prior to the signal processing for suppressing the GPS-bands jamming and Iridium-band jamming 13. The depicted embodiment shows an Iridium unprotected bypass mode of operation 14, whereby, if desired by the user, the Iridium radio bypasses its AJ protection. A circulator 15 enables passage of both Iridium uplink and downlink signals.

The GPS/Iridium AJ system 13 implements Nulling for the protection of the GPS L1 and/or L2 band transmissions and Beamforming for the protection of the Iridium user downlink transmission. Both Nulling and Beamforming algorithms run concurrently. Algorithms are implemented in a combination of hardware (HW), such as FPGA technology, and software (SW) running on a general purpose processor (GPP). An illustrative split between HW and SW functionality appears in FIG. 2 which is discussed in more detail later. The most compute-intensive aspects of the algorithms (e.g., fast-Fourier transform (FFT), matrix inversion/factorization) are preferably implemented in HW while less demanding aspects are implemented in SW (e.g., determination of beam direction, HW control). However, the particular division of work between HW and SW described herein is understood to be illustrative and not limiting.

An RF pathway out of the anti-jamming system to the Iridium radio is provided 16. Similarly, an RF pathway out of the anti-jamming system to the GPS receiver is provided 17. The anti-jamming system performs digital up-conversion (DUC) and then RF up-conversion (not shown) to yield the necessary RF signals required by the Iridium radio and the GPS receiver.

An inertial navigation system (INS) may interact with GPS 18 where GPS (when available) provides calibration information for the inertial measurements unit (IMU, component of the INS), and the INS provides the Iridium/GPS receiver platform attitude information used in beam pointing needed by the Beamformer.

BRIEF DESCRIPTION OF THE DRAWINGS

The instant specification is better understood using the drawings below. The drawings, however, are primarily for illustration and must not to be construed as limiting.

DETAILED DESCRIPTION OF THE INVENTION

FIG. 1 is an overview of one embodiment of the system depicting an eight element sCRPA 11 broadband receive antenna array integrated with an Iridium TX transceive patch antenna element 12. (The transceive patch element 12 supports Iridium user uplink data transmissions to the Iridium SV.) The specific types of patch element and array, and number of antenna elements are illustrative and not limiting. Signal outputs from the array are downconverted and digitized into complex baseband samples, available for digital modeforming (e.g., Butler array) prior to the signal processing for suppressing the GPS-bands jamming and Iridium-band jamming 13. The depicted embodiment shows an iridium unprotected bypass mode of operation 14, whereby, if desired by the user, the Iridium radio bypasses its AJ protection. A circulator 15 enables passage of both iridium uplink and downlink signals.

The GPS/Iridium AJ system 13 implements Nulling for the protection of the GPS L1 and/or L2 band transmissions and Beamforming for the protection of the Iridium user downlink transmission. Both Nulling and Beamforming algorithms run concurrently. Algorithms are implemented in a combination of hardware (HW), such as Field Programmable Gate Array (FPGA) or Application Specific Integrated Circuit (ASIC) technology, and software (SW) running on a general purpose processor (GPP). An illustrative split between HW and SW functionality appears in FIG. 2. The most compute-intensive aspects of the algorithms (e.g., fast-Fourier transform (FFT), matrix inversion/factorization) are preferably implemented in HW while less demanding aspects are implemented in SW (e.g., determination of beam direction, HW control). However, the particular division of work between HW and SW described herein is understood to be illustrative and not limiting.

The Nulling solution for the protection of GPS involves computing sample covariance matrices from the complex-valued, baseband (and, optionally, mode-formed) data output from the antenna array. The inverse of the sample covariance matrix is multiplied by a pseudo-steering vector to obtain the STAP-filter's complex-valued weight vector. The pseudo-steering vector is a unit vector where the unity-valued element normally corresponds to the branch center-tap of the omni-mode in mode-formed arrays. The Nulling solution is well-known art with already known performance characteristics and so further details are not provided. See, e.g., *Understanding GPS: Principles and Applications*, Editors: E. D. Kaplan and C. J. Hegarty, Artech House, 2006.

Figure 2:
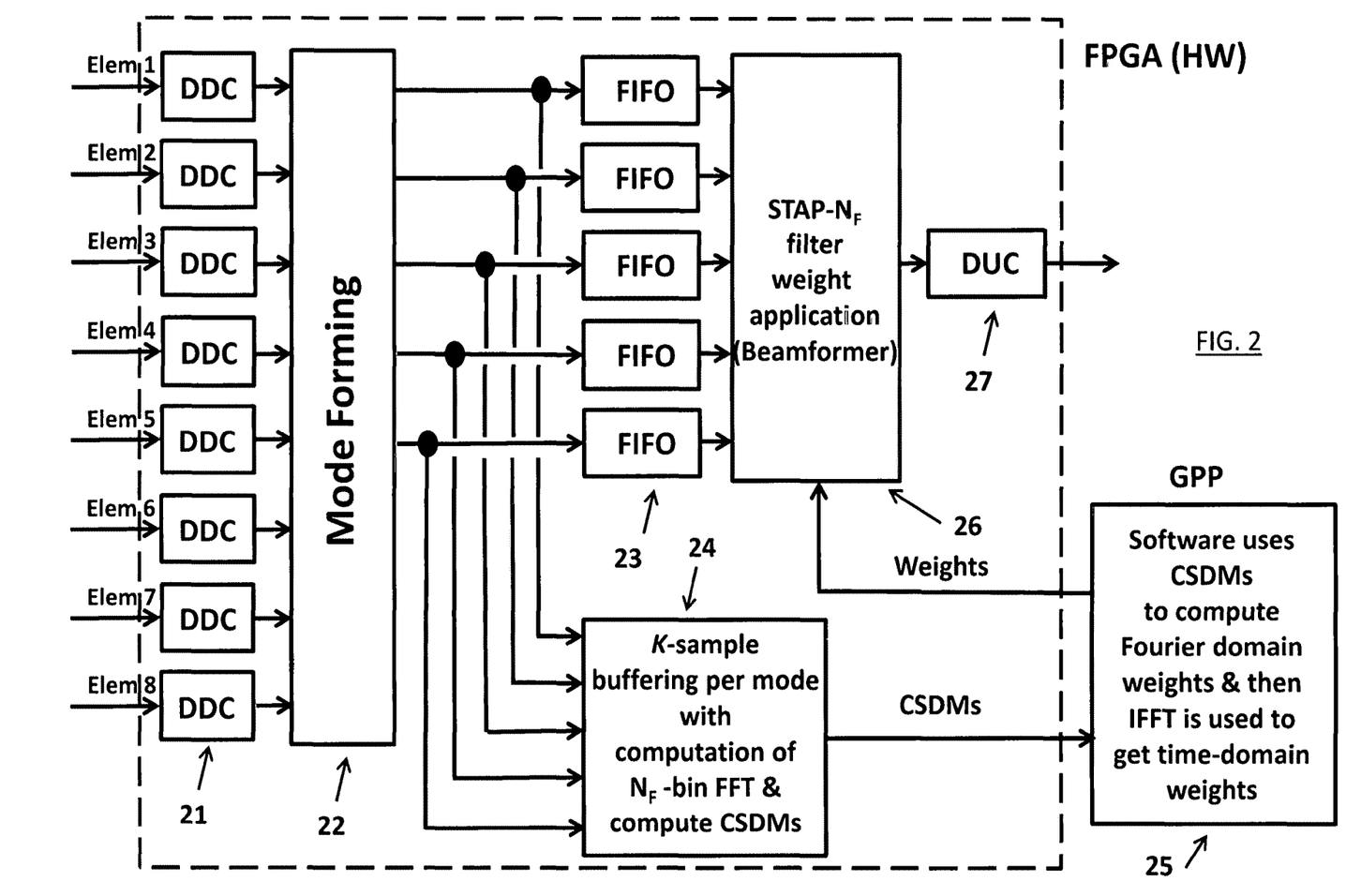
FIG. 2 is a block diagram of Beamforming showing a division of signal processing tasks between hardware (HW) and software (SW).

The Beamforming solution is closely examined in FIG. 2 with an illustrative but not limiting embodiment. Digital down converters (DDCs) 21 convert the real-valued outputs of analog-to-digital (A/D) converters (not shown) to complex baseband form. The example here shows without limitation that the eight DDC converter-bank outputs (which correspond, respectively, to the eight signals received from the eight antenna elements) are input to a digital mode-forming block 22, where the mode forming is implemented to select the five most efficient modes for the exemplary sCRPA array depicted in FIG. 1. (The choice of five modes is illustrative, and not limiting.) The complex-valued time-domain samples from the mode forming are also inputs to the aforementioned Nulling (not shown). However, for use in Beamforming the samples are preferably buffered (FIFO 23) before being STAP-filtered. The FIFOs permit matching the mode-formed samples that are to be filtered to their appropriate filter weights. The weights themselves are obtained by processing K-sample buffered mode-formed samples 24 (e.g., K=8192 complex samples/mode).

In this latter processing, described in further detail below, the time-domain. K-samples are Fourier transformed (e.g., via $N_F$-bin fast Fourier transform (FFT)), and the transformed data is formed into cross-spectral density matrices (CSDMs) 24, which may also be referred to as Fourier domain sample covariance matrices (per Owsley). The CSDMs are employed in the computation of Fourier domain STAP filter weights 25 as discussed below. Inverse FFT is employed to convert the Fourier domain weights into the time-domain 25 for use in the STAP filter 26. The STAP filter employs $N_F$ taps per finite impulse response (FIR) filter branch (FIG. 3) where one filter branch is allocated to each mode from the mode-formed array output. (For illustration in FIG. 3, L=5 for a 5-mode system.) The complex-valued samples are digitally up-converted (See e.g., DUC 27), which is the inverse processing to that of the DDC, followed by digital-to-analog (D/A) conversion 28 and RF up-conversion (not shown), and onward transmission to the Iridium radio.

Figure 3:
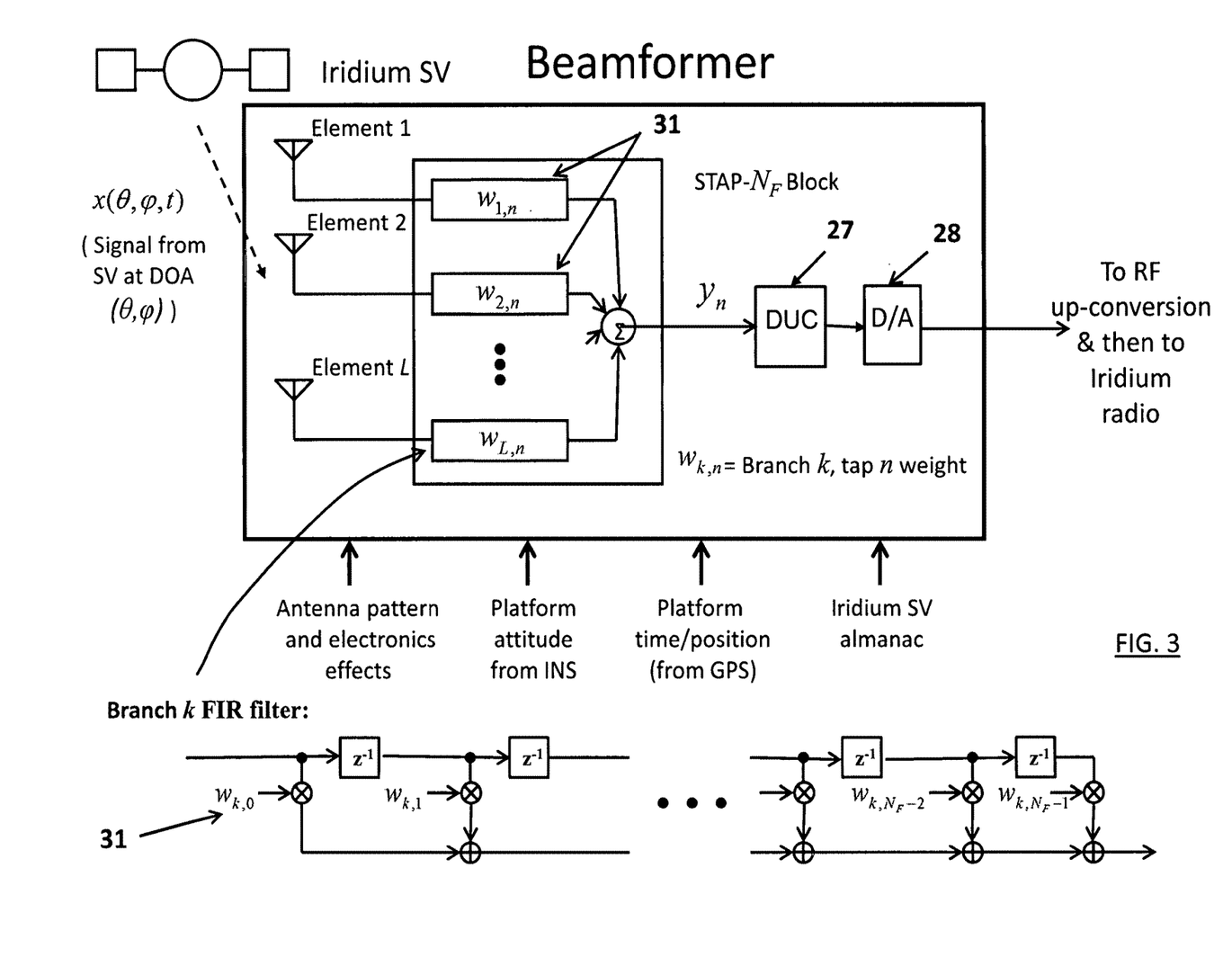
FIG. 3 is a block diagram of additional detail of the design of the Beamformer.

FIG. 3 illustrates the FIR filter signal processing 31 within the Beamformer 26, where $N_F$-tap filtering is applied to each of the L modes (in FIG. 2 we illustrate for L=5 as an example). The term $w_{k,n}$ in FIG. 3 denotes the tap n complex-valued weight applied to the mode-k branch. The mode-k antenna array response at the frequency ω in the Iridium space vehicle (SV) signal direction (θ, φ) (where θ=azimuth, φ=elevation in the platform's local Cartesian frame), may be represented as $A_k(\theta, \varphi, \omega)$. We call (θ, φ) the Iridium signal direction-of-arrival (DOA).

Thus, FIG. 3 also indicates that beamforming requires antenna pattern data (inclusive of RF electronics effects) for obtaining the correct steering vector to the Iridium SV. The direction-of-arrival (DOA) depends on the line-of-sight (LOS) to the Iridium SV from the platform hosting the antijam system (AJ system), inertial navigation system (INS), and GPS and Iridium receivers. The LOS is determined from both platform orientation ((INS)-derived information) and platform position (GPS-derived information) in space. Iridium SV almanac information is also needed to determine which Iridium SV is in view, as LOS also requires position information about the Iridium SV.

The Beamforming algorithm employed herein is Capon's algorithm (See, e.g., Capon, and Owsley). This algorithm minimizes the STAP filter output power to achieve milling of the interference, while at the same time the gain response of the STAP filter is constrained to unity to prevent nulling of the Iridium user's downlink signal.

Figure 4:
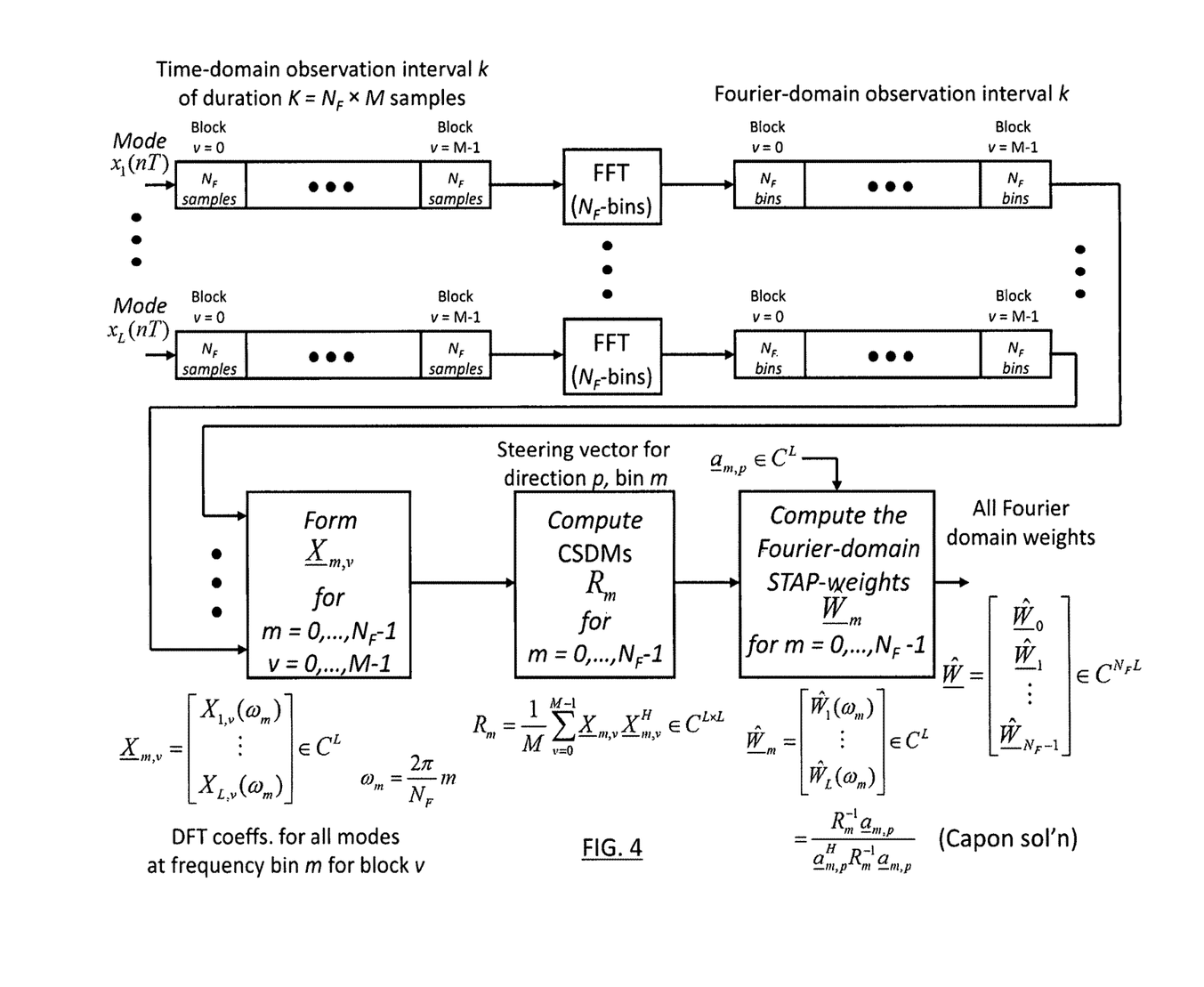
FIG. 4 is a block diagram of signal processing steps used to obtain the Beamformer weights in the Fourier domain.

FIG. 4 depicts the key signal processing steps involved in obtaining the Beamformer weights. The DDC 21 sample sequences are denoted $x_k(nT)$ where T is the DDC sampling interval and k=1, 2, . . . , L−1, L for an antenna array of L modes, e.g., L=5. In FIG. 4, sample blocks of length K complex samples per mode are sub-divided into non-overlapping segments each of length $N_F$ samples, and thus $K=MN_F$, for which M is the number of segments, Each $N_F$ length segment is transformed using $N_F$-bin DFT/FFT operations to obtain a K-sample transformed data (Fourier coefficients) set per mode. Relatively long sample blocks (large K) are needed to obtain good covariance estimates. It has been found in experimentation with a prototype system that K may range from 2048 to 8192 samples. Prototyping also shows that N=16 yields acceptable performance.

The Fourier bin m and segment (or block) v FFT coefficients for each mode are accumulated into a length L complex-valued column vector denoted $\underline{X}_{m,v}=[X_{1,v}(\omega_m) X_{2,v}(\omega_m) \ldots X_{L,v}(\omega_m)]^T$ in FIG. 4. The Fourier bin m cross-spectral density matrix (CSDM) (also called Fourier domain sample covariance matrix) is obtained via the outer products summations:

$$R_m = \frac{1}{M} \sum_{v=0}^{M-1} \underline{X}_{m,v} \underline{X}_{m,v}^H \in C^{L \times L} \quad (1)$$

These CSDMs are applicable for the observation time k, and the computed beamformer STAP weights (see below) apply to these same samples as well.

Following Owsley, the following quadratic programming problem (QPP), when solved using the steering vector $\underline{a}_{mp}$ (defined below), yields the Fourier domain STAP weights, $\hat{\underline{W}}_m$:

$$\hat{\underline{W}}_m = \underset{\underline{W}_m}{\mathrm{argmin}} \; \underline{W}_m^H R_m \underline{W}_m \text{ subject to } \underline{W}_m^H \underline{a}_{m,p} = 1 \quad (2a)$$

for m=0, 1, . . . $N_F$−1 in general, or only some relevant subset of these indices such as those covering the Iridium user downlink band.

The steering vector is $$\underline{a}_{m,p} = [A_1(\theta_p,\varphi_p,\omega_m) A_2(\theta_p,\varphi_p,\omega_m) \ldots A_L(\theta_p,\varphi_p,\omega_m)]$$
$$T \in C^L \quad (2b)$$

This is from pre-stored antenna pattern and includes all RF electronics effects at frequency $\omega_m$ (baseband equivalent, normalized frequency scale) in the pth signal direction ($\theta_p$, $\varphi_p$) (i.e., azimuth, elevation) over all of the available antenna array modes k=1, 2, . . . , L. Thus, $A_k(\theta, \varphi, \omega)$ represents the mode (or element, if there is no mode forming) k antenna pattern.

The linear equality constraint in (2a) constrains the STAP filter gain to be unity in the desired DOA, and across the band for which the constraints are applied. Implicitly, a linear phase response is also imposed over that band. However, the Iridium transmissions are very narrowband and so the linear phase response characteristic of the solution from solving (2a) is not critical.

From the method of Lagrange multipliers, the solution to the constrained QPP in (2a) is as follows, which is the well-known solution to the Capon beamforming weights design problem:

$$\hat{\underline{w}}_m = \frac{1}{a_{m,p}^H R_m^{-1} a_{m,p}} R_m^{-1} a_{m,p} = \begin{bmatrix} \hat{W}_1(\omega_m) \\ \hat{W}_2(\omega_m) \\ \vdots \\ \hat{W}_L(\omega_m) \end{bmatrix} \in C^L \quad (3)$$

The computation (3) is done for bin in covering the 10.5 MHz Iridium user band at complex baseband. The Fourier domain weights for a bin that is not in this band are simply set to zero. From Equation (3) we see that a given L-element solution vector contains the Fourier domain weights for all the modes at that bin index. Thus, an implementation must search through all solution vectors to extract all of the Fourier domain weights for any given mode of interest.

The Fourier domain weights from (3) are transformed into the time-domain using the inverse FFT so that filtering may be realized using STAP.

The Beamformer design described herein has been implemented as a prototype and tested a number of times against live in-sky Iridium satellite signals with broadband (BB) injected jamming signals. The Beamforming anti-jam (AJ) test procedure used was as follows:

a. Align 0-deg azimuth (AZ) angle of the antenna array to the true North direction.
b. Use software to predict a tracked Iridium satellite and ensure it is a rising satellite.
c. Without jamming, let the iridium phone track the satellite by going to "registered" state.
d. Turn on the broadband (BB) jammer to jam out the Iridium phone. The Iridium phone should go to "searching for network" state after the jammer is turned on. The jamming power at this time is the OMNI break point. Because we don't have enough time to dwell in the OMNI mode to search for the OMNI break point during AJ tests, this OMNI break point needs to be determined before the AJ tests.
e. Switch from OMNI mode to Beamforming ADAPT mode and wait for the Iridium phone to recover to the "registered" state. (The ADAPT mode pertains to Iridium handset operation in the presence of jammer signals.
f. Check if the Iridium phone remains in "registered" state for 15 seconds. If so, increase the jamming power by 5 dB. If the Iridium phone remains in "registered" state for another 15 seconds, then increase the jamming power by another 5 dB. Repeat the process until the Iridium phone goes to "searching for network" state; the jamming power at this time is at the ADAPT break point.
g. Record the jamming power at OMNI break point and ADAPT break point, and the difference is the AJ protection of Beamforming.

Figure 5:
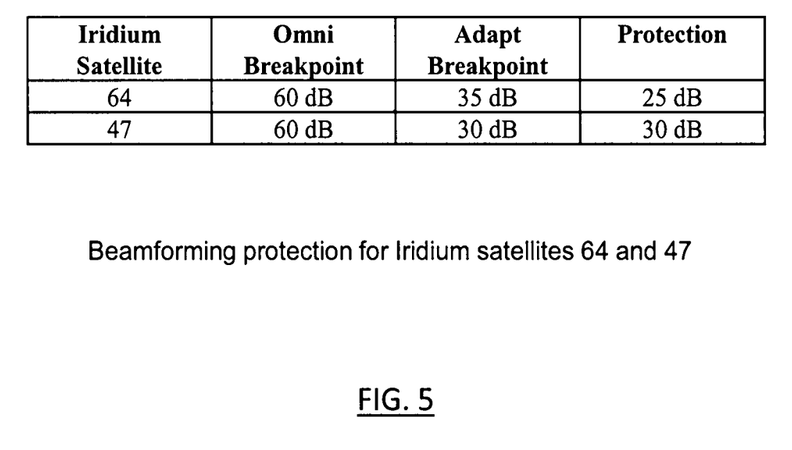
FIG. 5 is a table of Beamforming protection levels for Iridium SVs 64, and 47 from a test conducted on 11 Oct. 2016.
Figure 6:
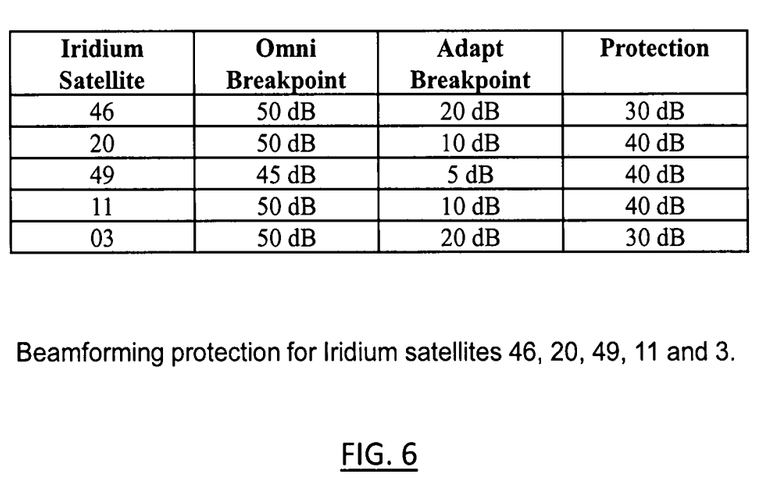
FIG. 6 is a table of Beamforming protection levels for Iridium SVs 46, 20, 49, 11, and 3 from a test conducted on 17 Oct. 2016.
Figure 7:
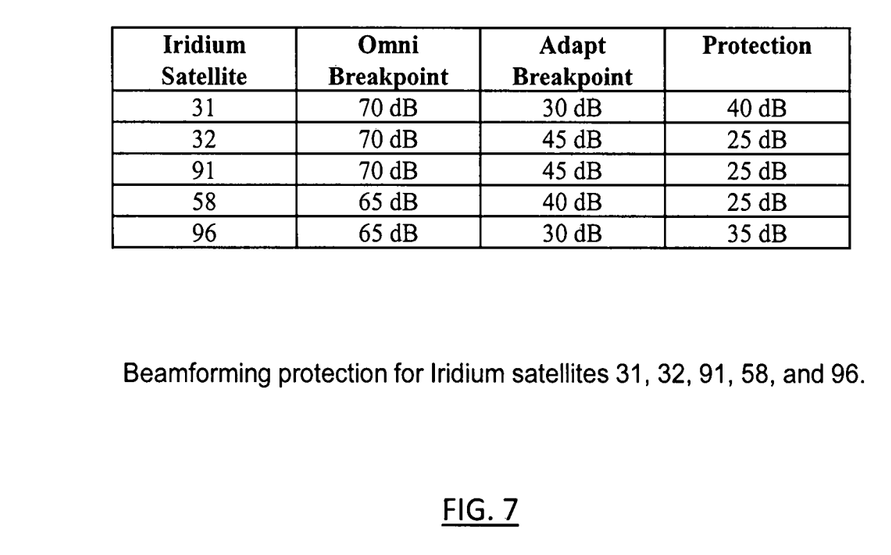
FIG. 7 is a table of Beamforming protection levels for Iridium SVs 31, 32, 91, 58, and 96 from a test conducted on 2 Nov. 2016.

FIG. 5, FIG. 6 and FIG. 7 provide tables of protection levels achieved based on this test procedure in the case of one BB jammer where each test was performed on a different day. Protection levels ranging from 25 to 40 dB were observed over a range of conditions.

The scope of the invention is to be limited only by the claims, and not by the drawings or description herein. The words "including", "comprising", "having," "with" and other like words used herein are to be interpreted broadly and comprehensively. Moreover, any embodiments disclosed in the subject application must not be taken as the only possible embodiments. Other embodiments will occur to those skilled in the art and are within the scope of the claims herein.

We claim:

1. An antijam system for suppressing interference signals received with Iridium and GPS and other GNSS signals at an antenna comprising:
    An antenna with signal reception coverage over the Iridium and GPS and other GNSS user bands;
    a RF front end for outputting downconverted and digitized antenna received signals;
    a hardware device configured to:
        receive and digitally downconvert the digitized signals to baseband,
        form modes with the baseband signals,
        suppress the interference signals by filtering using said modes, and
        output filtered Iridium and GPS and other GNSS signals;
    a navigation system for determining antenna orientation; and
    a general purpose processor programmed to support the suppression of the interference signals.

2. The system of claim 1, wherein the antenna is an antenna array.

3. The system of claim 2, wherein the antenna array is a broadband antenna array.

4. The system of claim 1, wherein the hardware device is a logic device.

5. The system of claim 4, wherein the logic device is a Field Programmable Gate Array (FPGA).

6. The system of claim 4, wherein the logic device is an Application Specific Integrated Circuit (ASIC).

7. The system of claim 1, wherein the modes are antenna modes.

8. The system of claim 1, wherein the interference signals are suppressed from the Iridium signals in a first filter.

9. The system of claim 8, wherein the first filter is a first STAP filter.

10. The system of claim 9, wherein filter weights are computed in the general purpose processor.

11. The system of claim 9, wherein the interference signals are suppressed from the Iridium signals in the first STAP filter by beamforming.

12. The system of claim 11, wherein the filtered Iridium signals are digitally up-converted and output from the hardware device for 4 RF conversion and up-conversion.

13. The system of claim 1, wherein the interference signals are suppressed from the GPS and other GNSS signals in a second filter.

14. The system of claim 13, wherein the second filter is a second STAP filter.

15. The system of claim 14, wherein the interference signals are suppressed from the GPS and other GNSS signals in the second STAP filter by nulling.

16. The system of claim 15, wherein the filtered GPS and other GNSS signals are output from the hardware device.

17. The system of claim 1, wherein the navigation system is an inertial navigation system.

18. The system of claim 17, wherein the inertial navigation system comprises an inertial measurement unit.

19. The system of claim 18, wherein the inertial measurement unit comprises at least one gyroscope.

20. The system of claim 1, wherein the navigation system includes at least one magnetic field sensor.

21. The system of claim 1, wherein the general purpose processor is a general purpose computer.

22. An antijam system for suppressing interference signals received with Iridium and GPS and other GNSS signals at an antenna comprising:
 an antenna with signal reception coverage over the Iridium and GPS and other GNSS user bands;
 a RF front end for downconverting the antenna received signals and digitizing said downconverted signals;
 a hardware device configured to:
  digitally downconvert the digitized signals to baseband, form modes with the baseband signals,
  suppress the interference signals using said modes from:
   the Iridium signals in a first filter, and
   the GPS and other GNSS signals in a second filter;
  output digital up-converted filtered Iridium signals for RF conversion and RF up-conversion for use with an Iridium radio; and
  output the filtered GPS and other GNSS signals for use with a GPS and other GNSS receiver;
 a navigation system for determining antenna orientation; and
 a general purpose processor programmed to support the suppression of the interference signals.

23. The system of claim 22, wherein the antenna is an antenna array.

24. The system of claim 23, wherein the antenna array is a broadband antenna array.

25. The system of claim 22, wherein the hardware device is a Field Programmable Gate Array (FPGA).

26. The system of claim 22, wherein the hardware device is an Application Specific Integrated Circuit (ASIC).

27. The system of claim 22, wherein the interference signals are suppressed from the Iridium signals by beamforming.

28. The system of claim 22, wherein the interference signals are suppressed from the GPS and other GNSS signals by nulling.

29. The system of claim 22, wherein the modes are antenna modes.

30. The system of claim 22, wherein the first filter is a STAP filter.

31. The system of claim 30, wherein filter weights are computed in the general purpose processor.

32. The system of claim 22, wherein the second filter is a STAP filter.

33. The system of claim 22, wherein the navigation system is an inertial navigation system.

34. The system of claim 33, wherein the inertial navigation system comprises an inertial measurement unit.

35. The system of claim 34, wherein the inertial measurement unit comprises at least one gyroscope.

36. The system of claim 22, wherein the navigation system includes a magnetic field sensor.

37. A method for suppressing interference signals received with Iridium and GPS and other GNSS signals comprising the steps of:
 receiving Iridium signals, GPS and other GNSS signals, and interference signals at an antenna array;
 downconverting the received signals;
 digitizing the downconverted signals;
 downconverting the digitized signals to baseband;
 forming modes with the baseband signals;
 determining position and orientation of the antenna array;
 suppressing the interference signals, using the modes, satellite almanac data, and the antenna array position and orientation, from:
  the Iridium signals in a first filter, and
  the GPS and other GNSS signals in a second filter;
 up-converting, and RF-converting and up-converting the filtered Iridium signals; and
 outputting separate filtered RF up-converted Iridium and digital GPS and other GNSS signals.

38. The method of claim 37, wherein the antenna array is a broadband antenna array.

39. The method of claim 37, wherein the downconverting and digitizing of the antenna array received signals is performed in an RF front end.

40. The method of claim 37, wherein the digital downconverting of the digitized signals to baseband is performed using digital downconverters.

41. The method of claim 37, wherein the first filter is a STAP filter.

42. The method of claim 37, wherein the second filter is a STAP filter.

43. The method of claim 37, wherein the steps of digital downconverting, mode forming, suppressing of the interference signals, and digital up-converting of the filtered Iridium signals are performed in a hardware device.

44. The method of claim 43, wherein the hardware device is a logic device.

45. The method of claim 44, wherein the logic device is a Field Programmable Gate Array (FPGA).

46. The method of claim 44, wherein the logic device is an Application Specific Integrated Circuit (ASIC).

* * * * *